(12) United States Patent
Fujimoto (10) Patent No.: US 12,533,842 B2
(45) Date of Patent: Jan. 27, 2026

(54) IMPRINT APPARATUS

(71) Applicant: CANON KABUSHIKI KAISHA, Tokyo (JP)

(72) Inventor: Masayoshi Fujimoto, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 251 days.

(21) Appl. No.: 17/967,225

(22) Filed: Oct. 17, 2022

(65) Prior Publication Data

US 2023/0138973 A1 May 4, 2023

(30) Foreign Application Priority Data

Nov. 4, 2021 (JP) .................... 2021-180305

(51) Int. Cl.
| | | |
|---|---|---|
| B29C 35/08 | (2006.01) | |
| B29C 59/00 | (2006.01) | |
| B29C 59/02 | (2006.01) | |
| B29C 59/16 | (2006.01) | |
| B29L 7/00 | (2006.01) | |
| B29L 9/00 | (2006.01) | |

(52) U.S. Cl.
CPC ........ *B29C 59/026* (2013.01); *B29C 35/0805* (2013.01); *B29C 59/002* (2013.01); *B29C 59/16* (2013.01); *B29L 2007/001* (2013.01); *B29L 2009/005* (2013.01)

(58) Field of Classification Search
CPC ..... B29C 59/026; B29C 59/002; B29C 59/16; B29C 59/022; B29C 35/0805; B29C 2059/023; B29L 2007/001; B29L 2009/005; G03F 7/70875; G03F 7/0002; H01L 21/0271

See application file for complete search history.

(56) References Cited

U.S. PATENT DOCUMENTS

| | | | |
|---|---|---|---|
| 9,993,962 B2 | 6/2018 | Cherala | |
| 10,998,190 B2 * | 5/2021 | Yoshida | ............... G02B 26/105 |

(Continued)

FOREIGN PATENT DOCUMENTS

| | | |
|---|---|---|
| JP | 2017212439 A | 11/2017 |
| JP | 2019054212 A | 4/2019 |

(Continued)

*Primary Examiner* — JaMel M Nelson
*Assistant Examiner* — Erica Hartsell Funk
(74) *Attorney, Agent, or Firm* — ROSSI, KIMMS & McDOWELL LLP (57) ABSTRACT

The imprint apparatus according to the present invention causes a supplying unit to supply an imprint material onto at least a first region in a predetermined shot region on a substrate, causes an energy supplying unit to supply energy to the imprint material on the first region so as to increase a degree of polymerization of the imprint material on the first region, causes a moving unit to move at least one of a mold and the substrate such that a pattern region formed on the mold and the imprint material on the substrate are brought into contact with each other, and causes the energy supplying unit to supply the energy to the imprint material on the predetermined shot region such that the imprint material on the predetermined shot region is solidified after the pattern region and the imprint material on the substrate are brought into contact with each other.

13 Claims, 6 Drawing Sheets

(56) References Cited

U.S. PATENT DOCUMENTS

2017/0285479 A1* 10/2017 Stachowiak .......... G03F 7/0002
2021/0157236 A1* 5/2021 Khusnatdinov ......... G03F 7/095

FOREIGN PATENT DOCUMENTS

| JP | 6732419 B2 * | 7/2020 | ............. B29C 33/42 |
| KR | 1020170132085 A | 12/2017 | |
| KR | 1020180116747 A | 10/2018 | |

* cited by examiner

IMPRINT APPARATUS

BACKGROUND OF THE INVENTION

Field of the Invention

The present invention is related to an imprint apparatus.

Description of the Related Art

Conventionally, it has been known that an overlay accuracy between a pattern already formed in a shot region of a substrate and a pattern to be newly formed deteriorates when an imprint apparatus performs an imprint process in a state in which a distortion occurs in the shot region.

Japanese Patent Application Laid-open No. 2017-212439 discloses an imprint apparatus which suppresses a decrease in overlay accuracy by changing a supply amount of an imprint material supplied to each region in a shot region of a substrate in accordance with a distortion in the shot region.

In the imprint apparatus disclosed in Japanese Patent Application Laid-open No. 2017-212439, a mold is brought into contact with an imprint material after the imprint material is supplied in different supply amounts to respective regions in a shot region of a substrate in accordance with distortion in the shot region.

Accordingly, the imprint material may spread to be planarized when the mold is brought into contact with the imprint material.

SUMMARY OF THE INVENTION

An object of the present invention is to provide an imprint apparatus capable of stably forming a pattern of an imprint material according to a distortion in a shot region of a substrate.

The imprint apparatus according to the present invention is an imprint apparatus for forming a pattern of an imprint material on a substrate by using a mold. The imprint apparatus includes a supplying unit configured to supply the imprint material onto the substrate, an energy supplying unit configured to supply energy for increasing a degree of polymerization to the imprint material on the substrate, a moving unit configured to move at least one of the mold and the substrate, and a controller, in which the controller is configured to perform a first supplying step of supplying the imprint material onto at least a first region in a predetermined shot region on the substrate by the supplying unit, a first energy supplying step of supplying the energy to the imprint material supplied onto the first region by the energy supplying unit so as to increase the degree of polymerization of the imprint material supplied onto the first region, a moving step of moving at least one of the mold and the substrate by the moving unit such that a pattern region formed on the mold and the imprint material on the substrate are brought into contact with each other, and a second energy supplying step of supplying the energy to the imprint material supplied onto the predetermined shot region by the energy supplying unit such that the imprint material supplied onto the predetermined shot region is solidified after the pattern region and the imprint material on the substrate are brought into contact with each other.

Further features of the present invention will become apparent from the following description of exemplary embodiments with reference to the attached drawings.

DESCRIPTION OF THE EMBODIMENTS

Hereinafter, an imprint apparatus according to the present invention is described in detail with reference to the accompanying drawings. Note that the embodiments described below do not limit the structures according to the set of claims of the present application.

Further, although a plurality of features are described in the present embodiments, all of the plurality of features are not necessarily essential, and a plurality of features may be arbitrarily combined.

Furthermore, the imprint apparatus is drawn on a scale different from the actual scale in order to facilitate understanding of the imprint apparatus according to the present invention in the accompanying drawings, and the same or similar components are denoted by the same reference numerals, and redundant description is omitted.

In addition, hereinafter, an axis perpendicular to the substrate surface of the substrate 10 is defined as a Z-axis, and two axes perpendicular to each other in a plane parallel to the substrate surface of the substrate 10 are defined as an X-axis and a Y-axis.

Further, rotation directions around the X-axis, the Y-axis and the Z-axis are defined as a OX direction, a OY direction, and a OZ direction, respectively.

First Embodiment

According to a demand for miniaturization in semiconductor devices, micro electro mechanical systems (MEMS)

or the like, an imprint technique of forming a pattern of an imprint material on a substrate surface by molding the imprint material on the substrate surface with a mold has attracted attention, in addition to a conventional photolithography technique.

By utilizing such an imprint technique, a nanoscale pattern can be formed on a substrate surface.

As described above, an imprint apparatus employing an imprint technique can be used to form a nanoscale pattern on a semiconductor wafer in a manufacturing process of a semiconductor device.

When a new pattern layer is laminated on a pattern layer already formed on the substrate surface, an accuracy of alignment between the two pattern layers is referred to as overlay accuracy which is important for making a semiconductor device to be manufactured function correctly.

In an imprint apparatus, a substrate is held by a substrate chuck which is polished to a very high degree of flatness so as to reduce a distortion of a substrate surface when the substrate is sucked.

However, there is a limit to the degree of flatness which can be achieved by polishing techniques, so that a substrate surface of the substrate may still be distorted when held by the substrate chuck due to the small amount of residual distortion in the substrate holding surface of the substrate chuck.

That is, a deviation in the flatness or planarity of the substrate holding surface of the substrate chuck may generate an in-plane distortion in the substrate plane to conform to the substrate holding surface of the substrate chuck.

When a pattern region formed on a mold is brought into contact with the imprint material supplied onto the substrate surface in which the in-plane distortion is generated in this manner, an in-plane distortion can be generated in the pattern region such that the pattern region matches the flatness of the substrate surface.

All of the above-described distortions become factors which degrade the overlay accuracy.

As described above, when the imprint material supplied onto the substrate surface and the pattern region formed in the mold are brought into contact with each other, it is required to cause the shapes of the substrate surface and the pattern region to coincide with each other in a mirror-symmetrical manner, thereby suppressing a deterioration of overlay accuracy in the imprint apparatus.

Further, in a case where a pattern has already been formed on the substrate surface, when the imprint material supplied onto the pattern and the pattern region formed in the mold are brought into contact with each other, the shapes of the pattern and the pattern region are required to coincide with each other.

Conventionally, there has been known an imprint apparatus which suppresses the deterioration of the overlay accuracy by changing a supply amount of an imprint material supplied to each region in a shot region in accordance with a distortion in the shot region on a substrate surface.

However, the mold is brought into contact with the imprint material after the imprint material is supplied to each region in the shot region in different supply amounts in such imprint apparatus.

Accordingly, the imprint material spreads to be flattened when the mold is brought into contact with the imprint material. As a result, it is difficult to suppress the deterioration in the overlay accuracy in accordance with the correction of a local distortion.

An object of the present invention is to provide an imprint apparatus which is advantageous particularly in overlay between a pattern of an imprint material already formed on a substrate surface and a pattern of the imprint material to be newly formed thereon, in view of such problem of the conventional technique.

Figure 1:
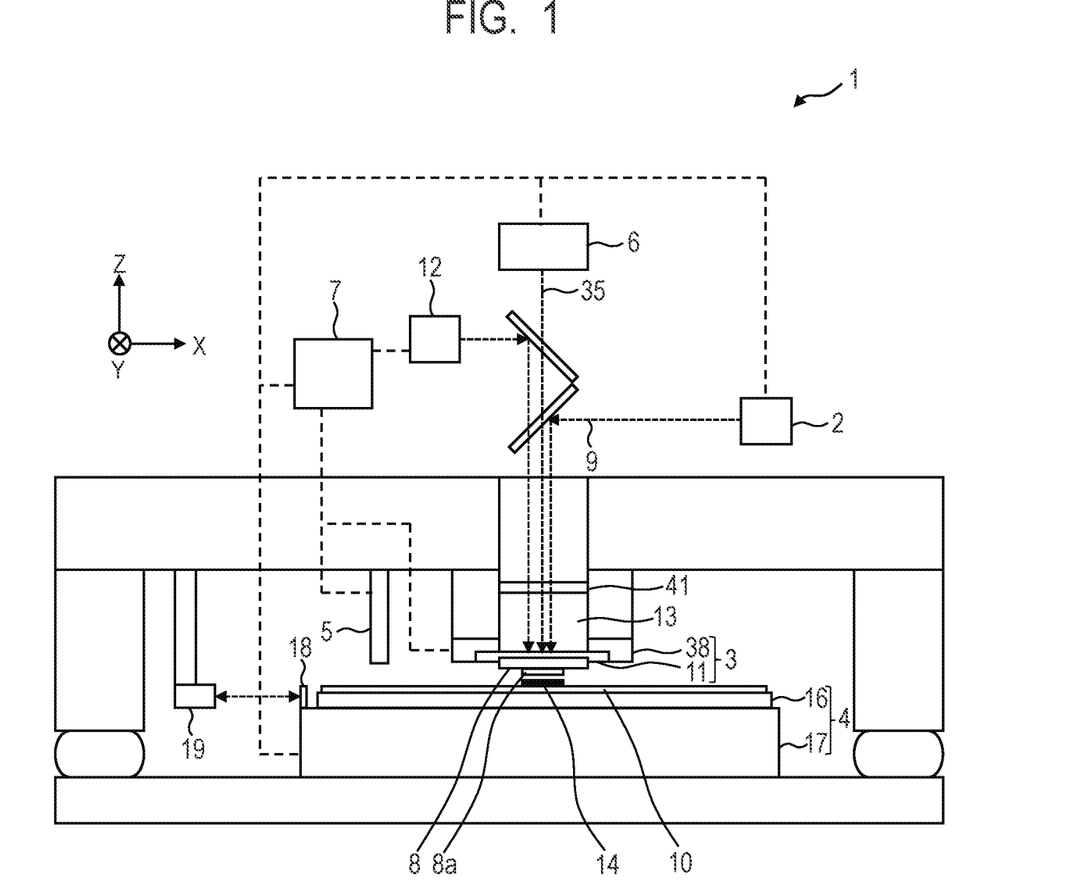
FIG. 1 is a schematic cross-sectional view of an imprint apparatus according to a first embodiment of the present invention.

FIG. 1 shows a schematic cross-sectional view of an imprint apparatus 1 according to a first embodiment of the present invention.

The imprint apparatus 1 according to the present embodiment is a lithography apparatus for forming a pattern of an imprint material on a substrate using a mold employed in a lithography process included in processes for manufacturing a device such as a semiconductor element, a liquid crystal display element, or a magnetic storage medium as an article.

Specifically, in the imprint apparatus 1 according to the present embodiment, an uncured imprint material supplied onto a substrate surface and a mold are brought into contact with each other (the mold is brought into contact with the imprint material on the substrate surface to perform imprinting). Thereafter, a pattern of a cured product to which a pattern of the mold has been transferred can be formed on the substrate surface by applying energy for curing to the imprint material.

The mold used herein is also referred to as a mold, a template, or an original.

In the imprint apparatus 1 according to the present embodiment, a material (a curable composition) which is cured by applying energy for curing thereto is used as the imprint material.

The energy for curing includes electromagnetic wave or heat. Examples of the electromagnetic wave include light having a wavelength selected from a range between 10 nm and 1 mm, specifically, infrared light, visible light and ultraviolet light.

In the imprint apparatus 1 according to the present embodiment, a composition which is cured by light irradiation or heating is used as the curable composition.

In particular, a photocurable composition which is cured by light irradiation contains at least a polymerizable compound and a photopolymerization initiator, and may further contain a non-polymerizable compound or a solvent as necessary.

The non-polymerizable compound used herein includes at least one selected from a group including a sensitizer, a hydrogen donor, an internal release agent, a surfactant, an antioxidant and a polymer component.

In the imprint apparatus 1 according to the present embodiment, the imprint material may be applied onto the substrate surface in a form of a film by a spin coater or a slit coater, or may be applied onto the substrate surface in the form of a droplet, the form of an island formed by connecting a plurality of droplets, or the form of the film by a liquid ejecting head.

Further, a viscosity (at 25° C.) of the imprint material used in the imprint apparatus 1 according to the present embodiment is 1 mPa's or more and 100 mPa's or less, for example.

In the imprint apparatus 1 according to the present embodiment, glass, ceramics, metal, semiconductor, resin or the like is used as a material of the substrate, and a member made of a material different from that of the substrate may be formed on the substrate surface as necessary.

Specifically, the substrate used in the imprint apparatus 1 according to the present embodiment includes a silicon wafer, a compound semiconductor wafer, quartz glass or the like.

As shown in FIG. 1, the imprint apparatus 1 according to the present embodiment includes a first irradiating unit 2 (an energy supplying unit), a mold holding unit 3 (an imprint head), a substrate holding unit 4 (a stage), a supplying unit 5 (a dispenser), an imaging unit 6 and a controller 7.

The first irradiating unit 2 emits light 9 for curing the imprint material 14 supplied onto the substrate 10. In other words, the first irradiating unit 2 supplies energy for increasing a degree of polymerization to the imprint material 14 supplied onto the substrate 10.

The imprint apparatus 1 according to the present embodiment uses an ultraviolet-curable imprint material which is cured by being irradiated with light 9 such as ultraviolet light from the first irradiating unit 2, as the imprint material 14.

That is, the imprint apparatus 1 according to the present embodiment employs a photo-curing method as a method for curing the imprint material 14.

However, the present invention is not limited thereto, and the imprint apparatus 1 according to the present embodiment may employ a heat-curing method for curing the imprint material 14 using heat as a method for curing the imprint material 14.

When the heat-curing method is employed, a heating unit which applies heat (heats the imprint material 14) for curing the imprint material 14 is provided instead of the first irradiating unit 2.

The mold holding unit 3 includes a mold chuck 11 for sucking to hold the mold 8, and a mold moving unit 38 (a moving unit) including an actuator capable of moving the mold chuck 11 which holds the mold 8 at least in the Z direction (a vertical direction).

The pattern region 8a formed on the mold 8 and the imprint material 14 on the substrate 10 are brought into contact with each other by moving the mold chuck 11 downward (in the −Z direction) by the mold moving unit 38.

Next, when the pattern region 8a formed on the mold 8 and the imprint material 14 on the substrate 10 are brought into contact with each other, the mold moving unit 38 is controlled by the controller 7 such that an imprint force applied to the mold 8 and the imprint material 14 on the substrate 10 becomes constant.

Thereafter, the imprint material 14 on the substrate 10 is cured, and the mold chuck 11 is moved upward (in the +Z direction) by the mold moving unit 38, thereby the pattern region 8a formed on the mold 8 is separated (released) from the cured imprint material 14 on the substrate 10.

Further, the mold holding unit 3 is provided with a recess for forming the space 13 defined (partitioned) by the partition plate 41 and the mold 8.

By adjusting a pressure in the space 13, (the pattern region 8a of) the mold 8 can be deformed when the pattern region 8a formed on the mold 8 and the imprint material 14 on the substrate 10 are brought into contact with each other or when the mold 8 is separated from the cured imprint material 14 on the substrate 10.

For example, the pattern region 8a formed on the mold 8 and the imprint material 14 on the substrate 10 can be brought into contact with each other in a state in which the mold 8 is deformed into a convex shape toward the substrate 10 by increasing the pressure in the space 13.

The substrate holding unit 4 includes a substrate chuck 16 for sucking to hold the substrate 10, and a substrate moving unit 17 (a moving unit) including an actuator capable of moving the substrate chuck 16 which holds the substrate 10 at least in the X direction and the Y direction.

The substrate holding unit 4 is provided with a mirror 18 and an interferometer 19, and a position of the substrate holding unit 4 is obtained from an optical path length measured between the mirror 18 and the interferometer 19.

The position of the substrate holding unit 4 may be obtained using an encoder instead of the mirror 18 and the interferometer 19.

The mold holding unit 3 which holds the mold 8 includes a posture adjusting unit for adjusting an inclination of the mold 8, and the substrate holding unit 4 which holds the substrate 10 includes a posture adjusting unit for adjusting an inclination of the substrate 10.

By correcting a relative inclination between the mold 8 and the substrate 10 using these posture adjusting units, the pattern region 8a formed on the mold 8 and a shot region on the substrate 10 can be made parallel to each other.

The relative inclination between the mold 8 and the substrate 10 may be corrected by the posture adjusting unit included in one of the mold holding unit 3 and the substrate holding unit 4, or may be corrected by the posture adjusting units included in each of the mold holding unit 3 and the substrate holding unit 4.

The supplying unit 5 supplies the imprint material 14 onto a predetermined shot region on the substrate 10.

The imaging unit 6 emits light 35 to image it which has passed through the mold 8 and been reflected by the substrate 10, thereby a contact state between the mold 8 and the imprint material on the substrate 10 is detected.

The controller 7 is formed by an information processing apparatus (a computer) including a CPU, a memory and the like, and integrally controls to operate each unit of the imprint apparatus 1 according to the present embodiment in accordance with a program stored in a storing unit (not illustrated).

Specifically, the controller 7 controls an imprint process for forming a pattern in each shot region on the substrate 10 and processes related thereto.

The controller 7 may be provided in the imprint apparatus 1 according to the present embodiment, or may be provided outside the imprint apparatus 1 according to the present embodiment.

The detecting unit 12 detects a mark (an alignment mark) formed on the mold 8 and a mark (an alignment mark) formed on the substrate 10.

After obtaining a relative positional deviation between the mold 8 and the substrate 10 from a detection result of the detection unit 12, the controller 7 can align the mold 8 and the substrate 10 by moving at least one of the mold 8 and the substrate 10.

In the imprint apparatus 1 according to the present embodiment, the mold moving unit 38 relatively moves the mold 8 with respect to the substrate 10 to bring the pattern region 8a formed on the mold 8 and the imprint material 14 on the substrate 10 into contact with each other, but the present invention is not limited thereto.

For example, the pattern region 8a formed on the mold 8 and the imprint material 14 on the substrate 10 may be brought into contact with each other by moving the substrate chuck 16 upward (in the +Z direction) by the substrate moving unit 17.

Further, the pattern region 8a formed on the mold 8 and the imprint material 14 on the substrate 10 may be brought into contact with each other by moving the mold chuck 11 downward by the mold moving unit 38 and moving the substrate chuck 16 upward by the substrate moving unit 17.

That is, at least one of the substrate moving unit 17 and the mold moving unit 38 can be used as a moving unit which relatively moves the mold 8 and the substrate 10 in order to bring the pattern region 8a and the imprint material 14 into contact with each other in the imprint apparatus 1 according to the present embodiment.

Figure 2A:
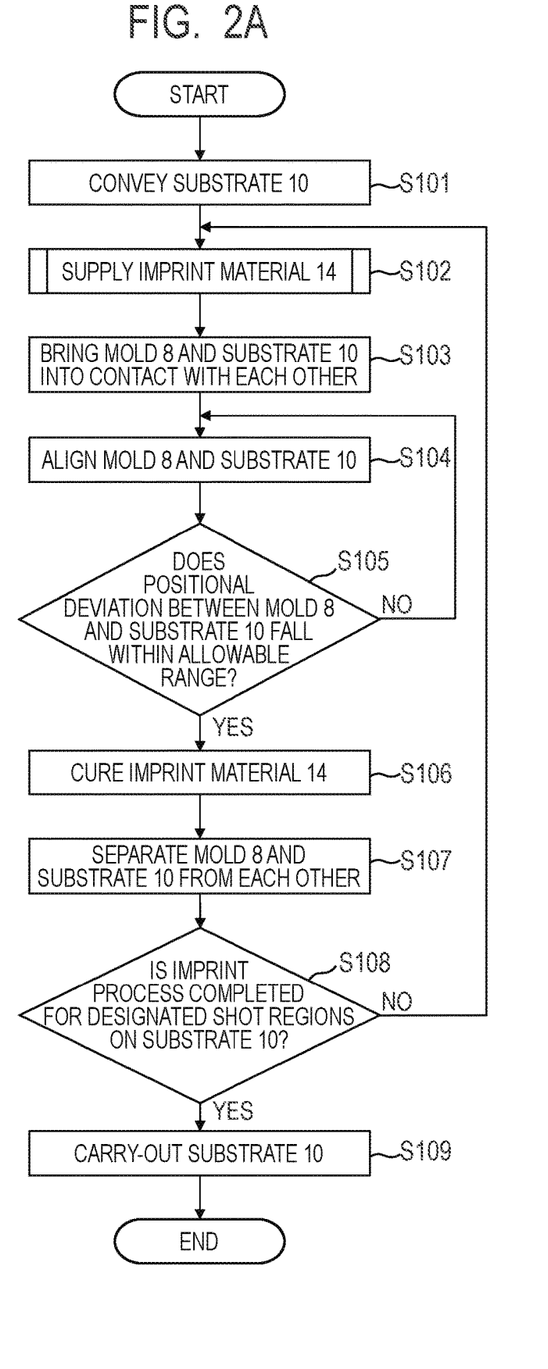
FIG. 2A is a flowchart showing an imprint process performed by the imprint apparatus according to the first embodiment.

FIG. 2A shows a flowchart of an operation of the imprint apparatus 1 according to the present embodiment, specifically an imprint process for forming a pattern by molding the imprint material 14 with the mold 8 in each shot region on the substrate 10.

Each step in the flowchart is controlled by the controller 7.

First, when the imprint process on the substrate 10 is started, the substrate 10 is conveyed into the imprint apparatus 1 according to the present embodiment (step S101).

Specifically, in the step S101, the substrate 10 is conveyed into the imprint apparatus 1 according to the present embodiment via a substrate conveying mechanism (not illustrated), and then the substrate 10 is held by the substrate chuck 16 of the substrate holding unit 4.

Next, a supplying step of supplying the imprint material 14 onto the substrate 10 is performed (step S102).

Specifically, in the step S102, the imprint material 14 is supplied from the supplying unit 5 to a predetermined shot region (a target shot region) on the substrate 10 on which a pattern of the imprint material 14 is to be formed.

Next, a contacting step (a moving step) of bringing the mold 8 and the imprint material 14 on the substrate 10 into contact with each other is performed (step S103).

Specifically, in the step S103, the imprint material 14 supplied onto the predetermined shot region on the substrate 10 and the pattern region 8a formed on the mold 8 are brought into contact with each other by bringing the mold 8 and the substrate 10 relatively close to each other.

Next, a relative alignment between the mold 8 and the substrate 10 is performed (step S104). The alignment in the step S104 is performed after the contacting step in the step S103 is finished, and a pattern in the pattern region 8a formed on the mold 8 is sufficiently filled with the imprint material 14.

Specifically, in the step S104, the detection unit 12 detects the mark formed on the mold 8 and the mark formed on the substrate 10, and then the relative alignment between the mold 8 and the substrate 10 is performed based on the detection result.

Here, in the imprint apparatus 1 according to the present embodiment, the relative alignment between the mold 8 and the substrate 10 is performed in the step S104, but a correction of a distortion which occurs in the mold 8, the substrate 10, the imprint apparatus 1 or any combination thereof is not performed.

The distortion referred to herein includes the distortion of the pattern formed on the mold 8 caused by deviation in flatness of holding surfaces of the substrate chuck 16 and the mold chuck 11, a main surface of the substrate 10, a main surface of the mold 8 or any combination thereof. In addition, the distortion referred to herein includes an error of the pattern formed on the mold 8 and the distortion of the substrate 10. All of these distortions affect an overlay accuracy.

In the imprint apparatus 1 according to the present embodiment, it is possible to correct the distortion of the pattern due to the deviation in flatness to improve the overlay accuracy by selectively increasing the degree of polymerization of the imprint material 14 supplied to a predetermined region on a shot region, as described below.

Figure 2B:
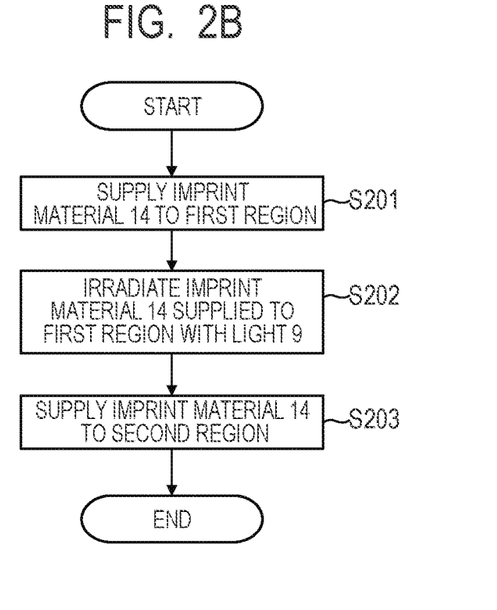
FIG. 2B is a flowchart showing the imprint process performed by the imprint apparatus according to the first embodiment.

FIG. 2B shows a flowchart indicating each step included in the step of supplying the imprint material 14 in the step S102 for correcting such distortion in the imprint apparatus 1 according to the present embodiment.

First, the imprint material 14 is supplied from the supplying unit 5 to a first region in a predetermined shot region on the substrate 10 based on information such as the distortion of the pattern formed on the mold 8 and the distortion of the substrate 10 as described above (step S201, a first supplying step).

Next, the imprint material 14 supplied to the first region in the step S201 is irradiated with the light 9 from the first irradiating unit 2 so as to increase the degree of polymerization (step S202, a first energy supplying step).

Note that an irradiation amount of the light 9 here is set such that the degree of polymerization of the imprint material 14 supplied to the first region is higher than that when the imprint material 14 is supplied in the step S201 and lower than that when the imprint material 14 is cured in the later step S106.

That is, in the step S202, the imprint material 14 supplied to the first region may be irradiated with the light 9 from the first irradiating unit 2 so as to increase the degree of polymerization of the imprint material 14 to an extent that the imprint material 14 is not cured.

In other words, the irradiation amount of the light 9 from the first irradiating unit 2 in the step S202 may be $1/10$ or less, preferably $1/100$ or less, and more preferably $1/1000$ or less of the irradiation amount necessary for curing the imprint material 14.

Further, when a magnitude of a shearing force generated in the relative alignment between the mold 8 and the substrate 10 in the step S104 exceeds the 10 N, there is a concern that each pattern shape collapses during the alignment to deteriorate the alignment accuracy.

Thus, when the light 9 is emitted from the first irradiating unit 2 in the step S202, the degree of polymerization of the imprint material 14 supplied to the first region may be increased such that the magnitude of the shearing force becomes 10 N or less, preferably 5 N or less, and more preferably 1 N or less.

In other words, assuming that the imprint material 14 is in a liquid state and a solid state when supplied in the step S201 and cured in the step S106, respectively, the imprint material 14 may be brought into a gel (semi-cured) state in the step S202.

The first region to which the imprint material 14 is supplied in the step S201 is determined based on information such as the distortion of the pattern formed on the mold 8 and the distortion of the substrate 10 due to the deviation in flatness (a determining step).

Specifically, the first region to which the imprint material 14 is supplied is determined based on information of the distortion obtained from positions and sizes detected in a plurality of marks formed in each of the predetermined shot region on the substrate 10 and the pattern region 8a on the mold 8.

Next, the imprint material 14 necessary for forming a pattern is supplied from the supplying unit 5 to a second region other than the first region in the predetermined shot region on the substrate 10 (step S203, a second supplying step).

A supply amount per unit area of the imprint material 14 supplied onto the second region in the step S203 is preferably smaller than that of the imprint material 14 supplied onto the first region in the step S201.

That is, it is possible to more effectively generate a distortion in the pattern region 8a as described below by setting the supply amount per unit area of the imprint material 14 in the step S201 to be larger than that of the imprint material 14 in the step S203.

Although an example in which the imprint material 14 is supplied to each of the first region and the second region in a predetermined shot region on the substrate 10 has been described above, the present invention is not limited to this.

That is, the predetermined shot region on the substrate 10 may be divided into three or more regions, and the supply of the imprint material 14 and the irradiation with the light 9 may be sequentially performed according to the above-described manner.

Returning to FIG. 2A, after the relative alignment between the mold 8 and the substrate 10 is performed in the step S104, it is determined whether the relative positional deviation between the mold 8 and the substrate 10 falls within an allowable range (step S105).

If the relative positional deviation between the mold 8 and the substrate 10 does not fall within the allowable range (No in the step S105), the process returns to the step S104, and the relative alignment between the mold 8 and the substrate 10 is performed again.

On the other hand, when the positional deviation falls within the allowable range (Yes in the step S105), the process proceeds to step S106. In the step S106, a curing step (a second energy supplying step) is performed in which the imprint material 14 supplied to the predetermined shot region on the substrate 10 is cured (solidified) by being irradiated with the light 9 from the first irradiating unit 2.

Figure 3A:
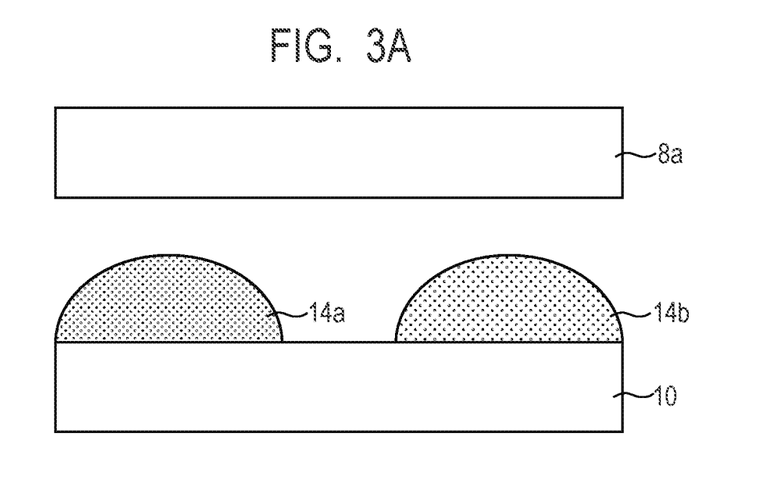
FIG. 3A is an enlarged cross-sectional view of a shot region when a predetermined step in the imprint process is performed by the imprint apparatus according to the first embodiment.

FIG. 3A shows an enlarged cross-sectional view of the predetermined shot region to which the imprint material 14 is supplied in the step S102.

Specifically, in FIG. 3A, the imprint material 14a having a relatively high degree of polymerization in the first region and the imprint material 14b having a relatively low degree of polymerization in the second region are illustrated.

In addition, in FIG. 3A, a pattern which has already been formed with a distortion between the substrate 10 and the imprint material 14a and between the substrate 10 and the imprint material 14b is not illustrated.

Figure 3B:
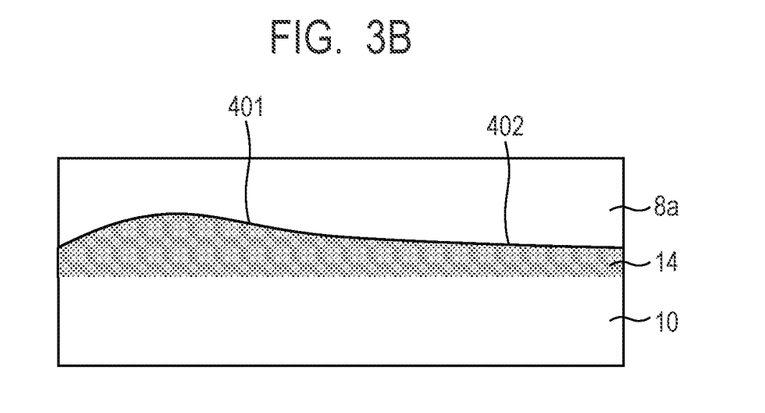
FIG. 3B is an enlarged cross-sectional view of a shot region when a predetermined step in the imprint process is performed by the imprint apparatus according to the first embodiment.

FIG. 3B shows an enlarged cross-sectional view of the predetermined shot region in which the steps S103 to S106 have been performed.

Specifically, in FIG. 3B, a center position 401 of the first region and a center position 402 of the second region are shown.

As shown in FIG. 3B, a spread by being pressed by the mold 8 in the step S103 of the imprint material 14a in the first region of which the degree of polymerization increases is suppressed more than that of the imprint material 14b in the second region.

Thus, the imprint material 14a in the first region becomes thicker than the imprint material 14b in the second region by performing the curing step in the step S106.

At this time, the pattern region 8a formed on the mold 8 is deformed so as to conform to such thickness distribution of the imprint material 14.

Specifically, at the position 401, a valley-fold (concave) bending force is applied to the pattern region 8a, thereby a deformation in a shrinking direction occurs in the pattern surface.

On the other hand, at the position 402, a mountain-fold (convex) bending force is applied to the pattern region 8a, thereby a deformation in an extending direction occurs in the pattern surface.

As described above, it is possible to generate a distortion in the pattern surface by generating a deviation in flatness in the pattern region 8a so as to conform to the thickness distribution of the imprint material 14 in the imprint apparatus 1 according to the present embodiment.

Returning to FIG. 2A, after the curing process in the step S106 is performed, a mold releasing step of separating the mold 8 and the imprint material 14 on the substrate 10 from each other is performed (step S107).

Then, it is determined whether or not the process including the steps S102 to S107 has been completed for all of designated shot regions on the substrate 10 (step S108).

If the process has not been completed for all of the designated shot regions on the substrate 10 (No in the step S108), the process returns to the step S102 to continue the process.

On the other hand, when the process has been completed for all of the designated shot regions on the substrate 10 (Yes in the step S108), the process proceeds to step S109, the substrate 10 is carried-out from the imprint apparatus 1 according to the present embodiment, and the imprint process for the substrate 10 is ended.

As described above, in the imprint apparatus 1 according to the present embodiment, the degree of polymerization of the imprint material 14 in the first region in the shot region on the substrate 10 is increased in the supplying step based on information about a distortion of the pattern formed on the mold 8, a distortion of the substrate 10 and the like due to a deviation in flatness.

In other words, the first region in the shot region is determined based on a difference between respective shapes of the pattern region 8a formed on the mold 8 and a predetermined shot region on the substrate 10, and the degree of polymerization of the imprint material 14 in the first region is increased.

As a result, an in-plane distortion is locally generated in the pattern region 8a of the mold 8 when the curing step is performed, so that an overlay accuracy can be improved.

Second Embodiment

Figure 4A:
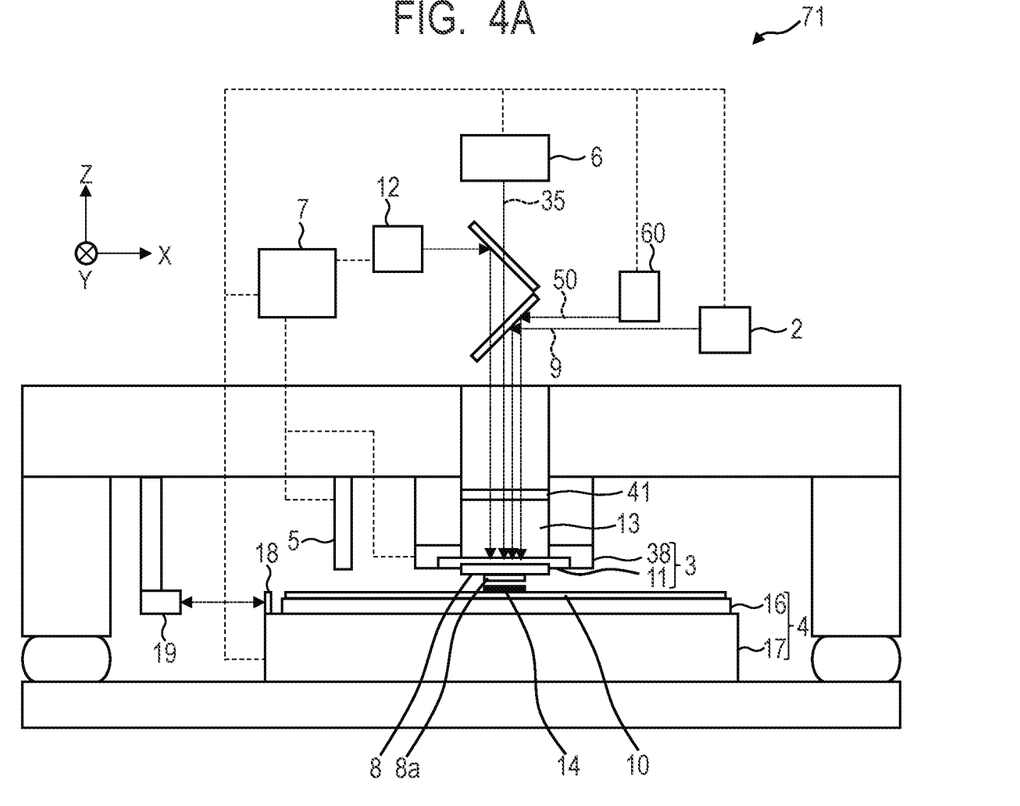
FIG. 4A is a schematic cross-sectional view of an imprint apparatus according to a second embodiment of the present invention.

FIG. 4A shows a schematic cross-sectional view of an imprint apparatus 71 according to a second embodiment of the present invention. Note that the imprint apparatus 71 according to the present embodiment has the same structure as the imprint apparatus 1 according to the first embodiment except that a second irradiating unit 60 is newly provided. Thus, the same members are denoted by the same reference numerals, and description thereof will be omitted.

Figure 4B:
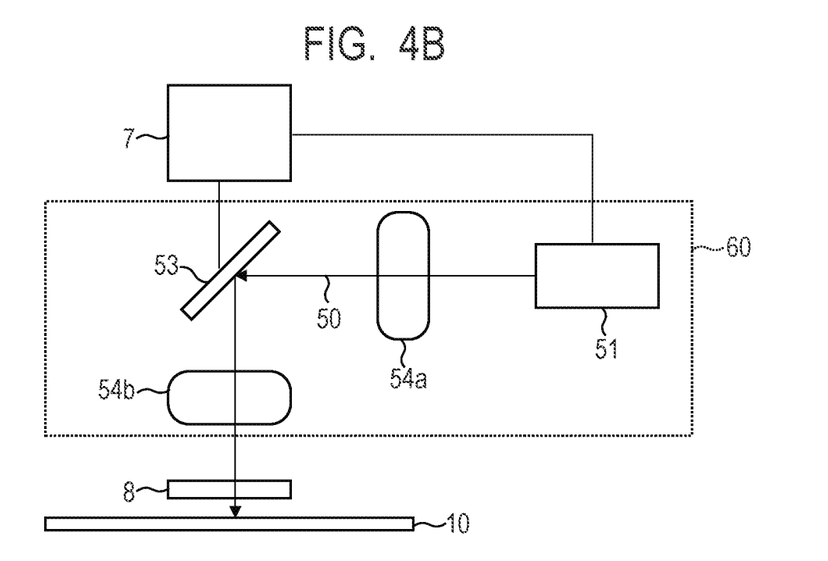
FIG. 4B is a partially enlarged schematic cross-sectional view of an imprint apparatus according to the second embodiment.

Further, FIG. 4B shows a schematic cross-sectional view of the second irradiating unit 60 (an energy supplying unit) provided in the imprint apparatus 71 according to the second embodiment.

As shown in FIG. 4B, the second irradiating unit 60 includes a light source 51, a light modulating element 53 (a spatial light modulating element), an optical element 54a and an optical element 54b, and can irradiate a predetermined region on the substrate 10 with light 50.

That is, the first irradiating unit 2 can irradiate an entire predetermined shot region on the substrate 10 with the light 9, whereas the second irradiating unit 60 can irradiate a predetermined region in the predetermined shot region on the substrate 10 with the light 50 in the imprint apparatus 71 according to the present embodiment.

The light source 51 is selected from light sources, such as a lamp, a laser diode or an LED, capable of obtaining an output necessary to emit the light 50 with a wavelength which causes the imprint material 14 on the substrate 10 to undergo a polymerization reaction (increase the degree of polymerization) so as to have a predetermined viscosity.

The light 50 emitted from the light source 51 passes through the optical elements 54a and is then guided to the light modulating element 53.

The light modulating element 53 is formed by a digital micromirror device (DMD).

By arranging the light modulating element 53 between the light source 51 and the substrate 10 to adjust angles of respective micromirrors, it is possible to arbitrarily control (set) a position and a size of an irradiated range of the light 50 on the substrate 10.

That is, a magnification of the light 50 is adjusted by the light modulating element 53 such that the light 50 is irradiated (projected) onto a predetermined region on the substrate 10 after passing through the optical device 54b.

In addition, an irradiating time of the light 50 onto the predetermined region on the substrate 10 can be arbitrarily controlled by changing the angle of each micromirror with time.

Note that the light modulating element 53 is not limited to a digital micromirror device, and an element such as a liquid crystal display (LCD) device or a liquid crystal on silicon (LCOS) device may be used.

In the imprint apparatus 71 according to the present embodiment, an overlay accuracy is improved by selectively increasing the degree of polymerization of the imprint material 14 on the substrate 10 using the light modulating element 53 based on information about a distortion of the pattern formed on the mold 8 and a distortion of the substrate 10 and the like due to a deviation in flatness.

Figure 5A:
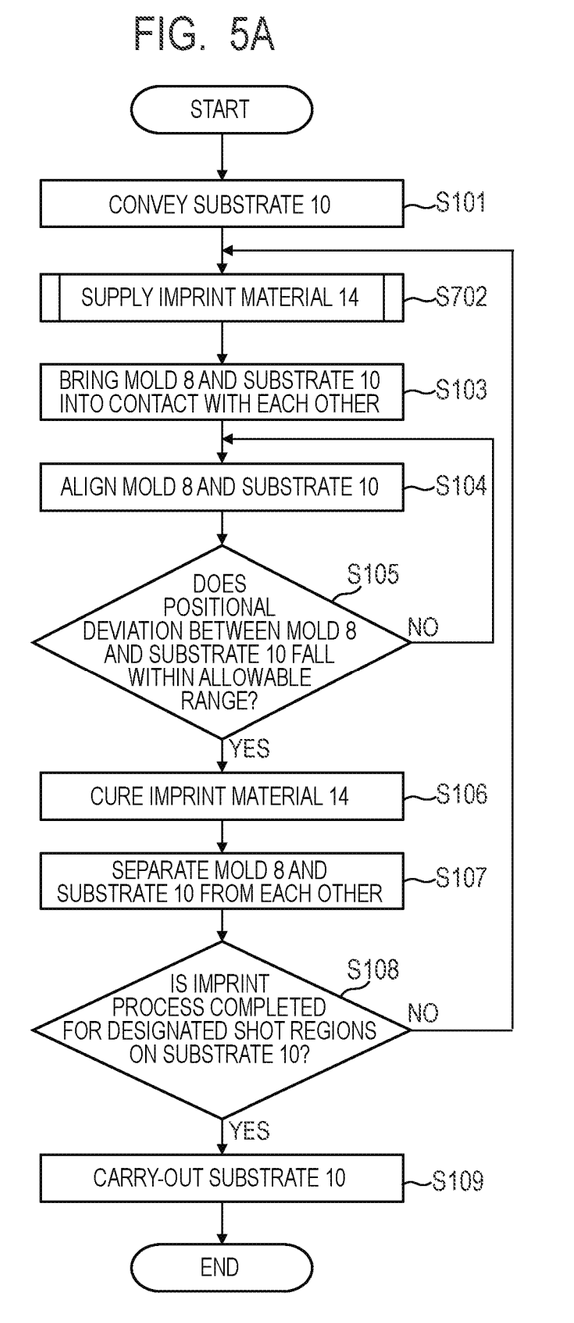
FIG. 5A is a flowchart showing an imprint process performed by the imprint apparatus according to the second embodiment.

FIG. 5A shows a flowchart of an operation in the imprint apparatus 71 according to the present embodiment, specifically an imprint process for forming a pattern by molding the imprint material 14 with the mold 8 in each shot region on the substrate 10.

Note that the flowchart in the imprint apparatus 71 according to the present embodiment is identical to that in the imprint apparatus 1 according to the first embodiment except that a step S702 is performed instead of the step S102 in the supplying step. Thus, only the step S702 will be described below.

Figure 5B:
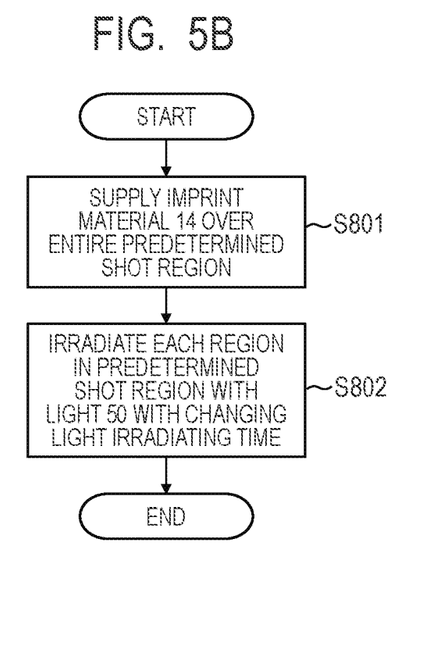
FIG. 5B is a flowchart showing the imprint process performed by the imprint apparatus according to the second embodiment.

FIG. 5B shows a flowchart indicating each step included in the supplying step of supplying the imprint material 14 in the step S702 in the imprint apparatus 71 according to the present embodiment.

First, the supplying unit 5 supplies the imprint material 14 over an entire predetermined shot region on the substrate 10 (step S801).

In the step S801, since the imprint material 14 is supplied over the entire predetermined shot region on the substrate 10, the imprint material 14 may be supplied in a film form onto the substrate 10 using a spin coater or a slit coater instead of the supplying unit 5.

Next, each region in the predetermined shot region on the substrate 10 is irradiated with the light 50 from the second irradiating unit 60 so as to change a light irradiating time in accordance with a distortion of the pattern formed on the mold 8, a distortion of the substrate 10 and the like due to a deviation in flatness (step S802).

Figure 6A:
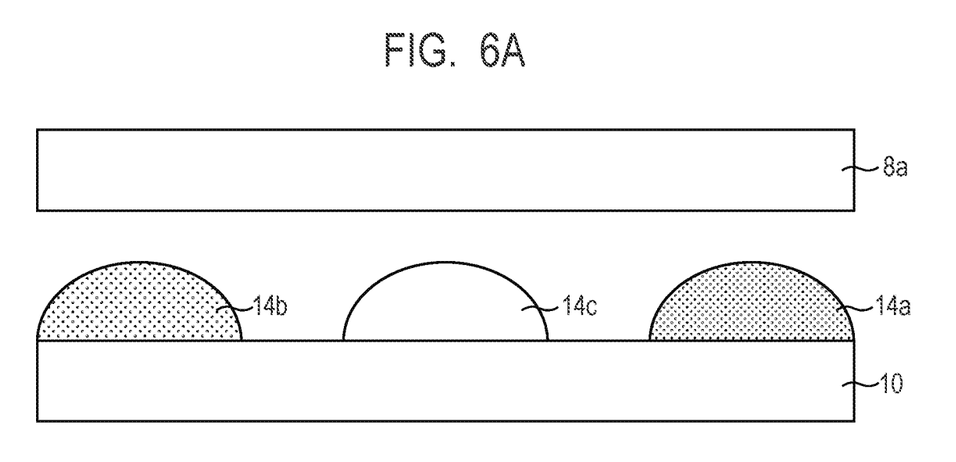
FIG. 6A is an enlarged cross-sectional view of a shot region when a predetermined step in the imprint process is performed by the imprint apparatus according to the second embodiment.

FIG. 6A shows an enlarged cross-sectional view of the predetermined shot region irradiated with the light 50 in the step S802.

Specifically, FIG. 6A illustrates an imprint material 14a having a relatively highest degree of polymerization, an imprint material 14b having a relatively second highest degree of polymerization, and an imprint material 14c having a relatively lowest degree of polymerization.

In addition, in FIG. 6A, a pattern which has been already formed with a distortion between the substrate 10 and the imprint material 14a, between the substrate 10 and the imprint material 14b, and between the substrate 10 and the imprint material 14c is not illustrated.

The degree of polymerization of the imprint material 14 changes according to a light amount of light with which the imprint material 14 is irradiated.

Accordingly, the degree of polymerization of the imprint material 14 in each region is adjusted by changing the irradiating time of the light 50 in the imprint apparatus 71 according to the present embodiment.

That is, in FIG. 6A, the irradiating time of the light 50 to the imprint material 14a is relatively the longest, the irradiating time of the light 50 to the imprint material 14b is relatively the second longest, and the irradiating time of the light 50 to the imprint material 14c is relatively the shortest.

Figure 6B:
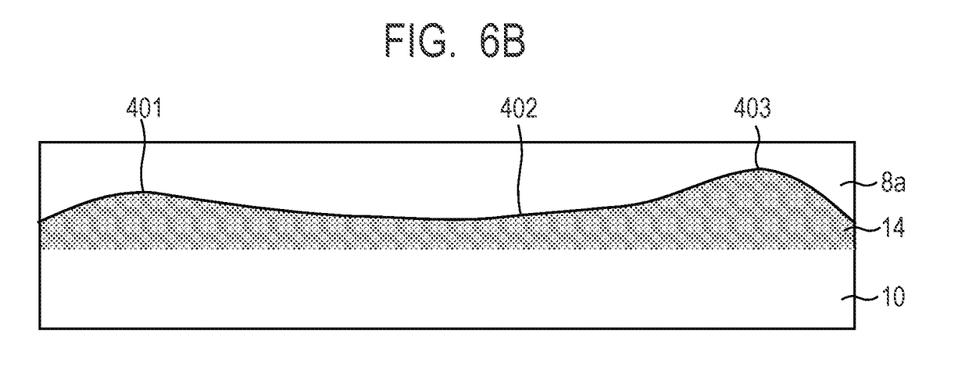
FIG. 6B is an enlarged cross-sectional view of a shot region when a predetermined step in the imprint process is performed by the imprint apparatus according to the second embodiment.

FIG. 6B shows an enlarged cross-sectional view of the predetermined shot region in which the steps S103 to S106 have been performed.

Specifically, FIG. 6B illustrates a center position 401 of a region to which the imprint material 14b is supplied, a center position 402 of a region to which the imprint material 14c is supplied, and a center position 403 of a region to which the imprint material 14a is supplied.

As shown in FIG. 6B, a spread by being pressed by the mold 8 in the step 103 is suppressed in the order of materials having a relatively high degree of polymerization, namely in the order of the imprint material 14a, the imprint material 14b and the imprint material 14c.

Accordingly, thicknesses of the imprint material 14a, the imprint material 14b and the imprint material 14c increase in this order, by performing the curing process in the step S106.

At this time, the pattern region 8a formed on the mold 8 is deformed so as to conform to such thickness distribution of the imprint material 14.

Specifically, at the position 401, a valley-fold (concave) bending force is applied to the pattern region 8a, thereby a deformation in a shrinking direction occurs in the pattern surface.

Further, at the position 403, a valley-fold (concave) bending force is applied to the pattern region 8a more strongly than at the position 401, thereby the deformation in the shrinking direction occurs in the pattern surface more largely than at the position 401.

On the other hand, at the position 402, a mountain-fold (convex) bending force is applied to the pattern region 8a, thereby a deformation in an extending direction occurs in the pattern surface.

As described above, it is possible to generate a distortion in the pattern surface by generating a deviation in flatness so as to conform to the thickness distribution of the imprint material 14 in the pattern region 8a in the imprint apparatus 71 according to the present embodiment.

In the above description, the irradiating times of the light 50 for the imprint material 14a, the imprint material 14b and the imprint material 14c are different from each other, but the present invention is not limited thereto.

That is, the irradiating times of the light 50 for the imprint material 14 supplied to two regions in a predetermined shot region on the substrate 10 may be made different from each other.

Further, the irradiating times of the light 50 for the imprint material 14 supplied to four or more regions in a predetermined shot region on the substrate 10 may be made different from each other.

As described above, in the imprint apparatus 1 according to the present embodiment, the degree of polymerization of the imprint material 14 is changed in each region in a shot region on the substrate 10 in the supplying step based on information about a distortion of the pattern formed on the mold 8 and a distortion of the substrate 10 and the like due to a deviation in flatness.

In other words, based on a difference between respective shapes of the pattern region 8a formed on the mold 8 and a predetermined shot region on the substrate 10, the degree of polymerization of the imprint material 14 in each region in the predetermined shot region is made different from each other.

As a result, an in-plane distortion is locally generated in the pattern region 8a on the mold 8 when the curing step is performed, thereby an overlay accuracy can be improved.

Note that a timing of irradiation with the light 50 in the imprint apparatus 71 according to the present embodiment is not limited to the supplying step in the step S702, and may be arbitrarily set between the contacting step in the step S103 and the curing step in the step S106.

That is, for example, the degree of polymerization of the imprint material 14 in a predetermined region may be increased by irradiating the imprint material 14 with the light 50 when the imprint material 14 has a desired thickness during the contacting step in the step S103.

According to the present invention, it is possible to provide an imprint apparatus which is particularly advantageous for an overlay between a pattern of an imprint material already formed on a substrate and a pattern of the imprint material to be newly formed thereon.

In other words, according to the present invention, it is possible to provide an imprint apparatus capable of forming a pattern of an imprint material stably in accordance with a distortion in a shot region on a substrate.

[Article Manufacturing Method]

A pattern of a cured product formed by using the imprint apparatus according to the present invention is used permanently in at least a part of various articles or temporarily when manufacturing various articles.

Examples of the article include an electric circuit element, an optical element, a MEMS, a recording element, a sensor and a mold.

Further, examples of the electric circuit element include volatile or non-volatile semiconductor memories such as a dynamic random access memory (DRAM), a static random access memory (SRAM), a flash memory and a magnetoresistive random access memory (MRAM), and semiconductor elements such as a large scale integration (LSI), a charge coupled device (CCD), an image sensor and a field programmable gate array (FPGA).

Furthermore, an example of the mold includes a mold for imprinting.

The pattern of the cured product formed by using the imprint apparatus according to the present invention is used as it is as a constituent member of at least a part of the above-described article.

Alternatively, the pattern of the cured product is temporarily used as a resist mask, and the resist mask is removed after etching, ion implantation or the like is performed in a step for processing a substrate.

Although preferred embodiments have been described above, the present invention is not limited to these embodiments, and various modifications and changes can be made within the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-180305, filed Nov. 4, 2021, which is hereby incorporated by reference herein in its entirety.

What is claimed is:

1. An imprint apparatus for forming a pattern of an imprint material on a substrate by using a mold, the imprint apparatus comprising:
    a supplying unit configured to supply the imprint material onto the substrate;
    an energy supplying unit configured to supply energy for increasing a degree of polymerization to the imprint material on the substrate;
    a moving unit configured to move at least one of the mold and the substrate; and
    a controller programmed to perform:
        a first supplying step of supplying the imprint material onto at least a first region in a predetermined shot region on the substrate by the supplying unit, the first region being determined based on information on a distortion of the substrate caused by a deviation in flatness of a surface of the substrate;
        a first energy supplying step of supplying the energy to the imprint material supplied onto the first region by the energy supplying unit so as to increase the degree of polymerization of the imprint material supplied onto the first region, without fully curing the imprint material supplied onto the first region;
        a second supplying step of supplying the imprint material onto a second region other than the first region in the predetermined shot region by the supplying unit after performing the first energy supplying step;
        a moving step of moving at least one of the mold and the substrate by the moving unit such that a pattern region formed on the mold and the imprint material on the substrate are brought into contact with each other, after performing the second supplying step; and
        a second energy supplying step of supplying the energy to the imprint material supplied onto the predetermined shot region by the energy supplying unit such that the imprint material supplied onto the predetermined shot region is solidified after the pattern region and the imprint material on the substrate are brought into contact with each other.

2. The imprint apparatus according to claim 1, wherein the controller is programmed to perform the first supplying step and the second supplying step such that a supply amount per unit area of the imprint material in the first region is larger than the supply amount per unit area of the imprint material in the second region.

3. The imprint apparatus according to claim 1, wherein the controller is programmed to further determine the first region based on a difference between respective shapes of the pattern region and the predetermined shot region.

4. The imprint apparatus according to claim 1, wherein the energy supplying unit includes an irradiating unit configured to irradiate the imprint material on the substrate with light.

5. The imprint apparatus according to claim 4, wherein the irradiating unit includes a first irradiating unit configured to irradiate an entire predetermined shot region on the substrate with light, and a second irradiating unit configured to irradiate a predetermined region in the predetermined shot region with light.

6. The imprint apparatus according to claim 1, wherein the energy supplying unit includes a heating unit configured to heat the imprint material on the substrate.

7. An article manufacturing method for manufacturing an article from a processed substrate, the article manufacturing method comprising:
- a step of forming a pattern of an imprint material on a substrate using a mold by using an imprint apparatus including:
  - a supplying unit configured to supply the imprint material onto the substrate;
  - an energy supplying unit configured to supply energy for increasing a degree of polymerization to the imprint material on the substrate;
  - a moving unit configured to move at least one of the mold and the substrate; and
  - a controller programmed to perform:
    - a first supplying step of supplying the imprint material onto at least a first region in a predetermined shot region on the substrate by the supplying unit, the first region being determined based on information on a distortion of the substrate caused by a deviation in flatness of a surface of the substrate;
    - a first energy supplying step of supplying the energy to the imprint material supplied onto the first region by the energy supplying unit so as to increase the degree of polymerization of the imprint material supplied onto the first region, without fully curing the imprint material supplied onto the first region;
    - a second supplying step of supplying the imprint material onto a second region other than the first region in the predetermined shot region by the supplying unit after performing the first energy supplying step;
    - a moving step of moving at least one of the mold and the substrate by the moving unit such that a pattern region formed on the mold and the imprint material on the substrate are brought into contact with each other, after performing the second supplying step; and
    - a second energy supplying step of supplying the energy to the imprint material supplied onto the predetermined shot region by the energy supplying unit such that the imprint material supplied onto the predetermined shot region is solidified after the pattern region and the imprint material on the substrate are brought into contact with each other; and
- a step of processing the substrate on which the pattern is formed.

8. A method of controlling an imprint apparatus via a programmed controller to form a pattern of an imprint material on a substrate using a mold, the imprint apparatus including a supplying unit configured to supply the imprint material onto the substrate, an energy supplying unit configured to supply energy for increasing a degree of polymerization to the imprint material on the substrate, and a moving unit configured to move at least one of the mold and the substrate, the method comprising:
- a first supplying step of supplying the imprint material onto at least a first region in a predetermined shot region on the substrate by the supplying unit, the first region being determined based on information on a distortion of the substrate caused by a deviation in flatness of a surface of the substrate;
- a first energy supplying step of supplying the energy to the imprint material supplied onto the first region by the energy supplying unit so as to increase the degree of polymerization of the imprint material supplied onto the first region, without fully curing the imprint material supplied onto the first region;
- a second supplying step of supplying the imprint material onto a second region other than the first region in the predetermined shot region by the supplying unit after performing the first energy supplying step;
- a moving step of moving at least one of the mold and the substrate by the moving unit such that a pattern region formed on the mold and the imprint material on the substrate are brought into contact with each other, after performing the second supplying step; and
- a second energy supplying step of supplying the energy to the imprint material supplied onto the predetermined shot region by the energy supplying unit such that the imprint material supplied onto the predetermined shot region is solidified after the pattern region and the imprint material on the substrate are brought into contact with each other.

9. The method according to claim 8, wherein a supply amount per unit area of the imprint material in the first region in the first supplying step is larger than the supply amount per unit area of the imprint material in the second region in the second supplying step.

10. The method according to claim 8, further comprising a determining step of determining the first region based on a difference between respective shapes of the pattern region and the predetermined shot region.

11. The method according to claim 8, wherein the energy supplying unit includes an irradiating unit configured to irradiate the imprint material on the substrate with light.

12. The method according to claim 11, wherein the irradiating unit includes a first irradiating unit configured to irradiate an entire predetermined shot region on the substrate with light, and a second irradiating unit configured to irradiate a predetermined region in the predetermined shot region with light.

13. The method according to claim 8, wherein the energy supplying unit includes a heating unit configured to heat the imprint material on the substrate.

* * * * *